United States Patent [19]

Gradeler et al.

[11] Patent Number: 5,530,718
[45] Date of Patent: Jun. 25, 1996

[54] METHOD AND APPARATUS FOR DETECTING AN ESCAPE SEQUENCE IN A MODEM

[75] Inventors: Eric Gradeler, Los Altos Hills, Calif.; Thierry Nicolle, Sannois; Alexis Pham, Guyancourt, both of France

[73] Assignee: Apple Computer, Inc., Cupertino, Calif.

[21] Appl. No.: 224,274

[22] Filed: Apr. 7, 1994

Related U.S. Application Data

[63] Continuation of PCT/FR92/00942, Oct. 9, 1992, published as WO93/07707, Apr. 15, 1993.

[30] Foreign Application Priority Data

Oct. 11, 1991 [FR] France .................................. 91 12546

[51] Int. Cl.⁶ ................................ H04B 1/38; H04L 5/16
[52] U.S. Cl. ............................................................ 375/222
[58] Field of Search ............................... 375/8, 121, 223; 379/93, 94

[56] References Cited

U.S. PATENT DOCUMENTS

| | | | |
|---|---|---|---|
| 4,387,440 | 6/1983 | Eaton . | |
| 4,549,302 | 10/1985 | Heatherington | 379/97 |
| 4,926,448 | 5/1990 | Kraul et al. | 375/121 |
| 5,107,518 | 4/1992 | Petty, Jr. | 375/8 |
| 5,295,156 | 3/1994 | Heep et al. | 375/8 |
| 5,359,648 | 10/1994 | Dunn et al. | 375/8 |
| B1 4,387,440 | 4/1986 | Eaton . | |

FOREIGN PATENT DOCUMENTS

3642323A1  6/1987  Germany .

Primary Examiner—Stephen Chin
Assistant Examiner—Don N. Vo
Attorney, Agent, or Firm—Blakely, Sokoloff, Taylor & Zafman

[57] ABSTRACT

A method and apparatus for detecting an escape sequence to cause a modem to switch from a data transmission mode to a command mode. The escape sequence precedes a command instruction. The escape sequence comprises a first predetermined set of characters and a second predetermined set of characters. The method comprises the steps of temporarily storing in succession in a memory M characters received by the modem from a host computer; detecting whether the memory contains in contiguous manner the first and second sets of characters; leaving the modem in data transmission mode if the memory does not contain the contiguous occurrence of the first and second predetermined sets of characters; if the memory does contain the contiguous occurrence of the first and second predetermined sets of characters, detecting whether an end-of-instruction code is to be found in the N characters following the first and second contiguous predetermined sets of characters; leaving the modem in a transmission mode if the end-of-instruction code is not detected in said N characters; and if the end-of-instruction code is detected in said N characters, authorizing the modem to switch from data transmission mode to command mode.

18 Claims, 1 Drawing Sheet

METHOD AND APPARATUS FOR DETECTING AN ESCAPE SEQUENCE IN A MODEM

This application is a continuation of PCT Application Ser. No. PCT/FR92/00942, filed on Oct. 9, 1992.

BACKGROUND OF THE INVENTION

The present invention relates in general to intelligent modems for transmitting digital data between computers over a telephone line.

More precisely, the invention relates to a novel method of detecting a so-called "escape" sequence for causing the modem to switch from a data transmission mode to a command mode.

DESCRIPTION OF THE PRIOR ART

Conventionally, a modem has two operating modes. In a so-called "on-line" mode, the modulator-demodulator circuit is activated to transmit over the telephone line modulated signals that correspond to digital data for sending to the remote computer, and to receive from the line signals that have been modulated by the remote computer and to convert them into digital signals for the local computer. In a so-called "command" mode, the connection between the local computer and the modem is used for conveying instructions, e.g. relating to the operating mode of the modem (data transfer rate, etc.) or to telephone line signalling (dialing, off-hook, on-hook, etc.), and during this time the modulator/demodulator is inactive.

It will be understood that while the modem is "on-line" and transmitting data, there exists a difficulty in switching it to "command" mode since the modem in question is then assuming, a priori, that all data coming from the host computer is data for forwarding over the telephone line.

In the prior art, a mechanism is already known from U.S. Pat. No. 4,549,302 to Heatherington for recognizing an escape sequence whereby, in order to switch the modem from "on-line" mode to "command" mode, the host computer sends a sequence to the modem, e.g. at the end of a set of data for transmission, which sequence is constituted by a first period of silence of predetermined duration, one or more so-called "escape" characters (in practice and in application of a current standard, these comprise a succession of three "+" symbols expressed in standard ASCII code and written hereinafter as "+++"), followed by a second predetermined period of silence. The modem includes logic means and timing means that are suitable for monitoring the stream of data for the appearance of such a sequence. In theory, once the sequence has been detected, the modem returns an acknowledge signal to the host computer, written as "OK", thereby assuring the computer that the modem has indeed switched to "command" mode. Thereafter, the computer can send instructions to the modem and, in the above-mentioned standard, these instructions may have the following form:

ATxxx . . . xxx<CR> where:

"AT" designates either the character sequence "A" followed by "T" in ASCII code, or else the same characters but in lower case;

xxx . . . xxx is the specifier of an instruction, forming a part of a standard set of instructions and having a maximum length that is 40 characters, for example; and <CR> designates the code for "carriage return" in ASCII code.

A major drawback of this known mode of escape control lies in the fact that it requires timing means, either in the form of hardware or else in the form of software, for the purpose of recognizing the above-mentioned periods of silence.

Furthermore, the applicant has observed that in most communications software implemented on a host computer for cooperating with a modem, the software does not verify that the above-mentioned acknowledge signal "OK" has been received.

SUMMARY OF THE INVENTION

The present invention seeks to take advantage of this observation to mitigate the above-mentioned drawback, while remaining entirely compatible with the escape sequences and instruction formats that are conventionally used.

To this end, the preferred embodiment of the present invention provides a method of detecting an escape sequence to cause a modem to switch from a data transmission mode in which a stream of digital data can be supplied to the modem from an associated host computer or the like, be modulated by the modem and be transmitted over a telephone line or the like, to a command mode in which the modem can receive command instructions from said host computer without modulating them and without transmitting them over said line, said escape sequence comprising a first predetermined set of characters a period of silence of predetermined duration, and each command instruction being preceded by a second predetermined set of characters, the method being characterized in that it comprises the following iterative steps:

a) temporarily storing in succession in a memory but taking no account of time, the M characters most recently received by the modem from the host computer, where M is a first predetermined number;

b) detecting whether said memory contains in contiguous manner said first predetermined set of characters and said second predetermined set of characters;

c) if the memory does not contain the contiguous occurrence of the first and second predetermined sets of characters, then, leaving the modem in data transmission mode;

d) if the memory does contain the contiguous occurrence of the first and second predetermined sets of characters, then, detecting whether an end-of-instruction code is to be found in the N characters following said first and second contiguous predetermined sets of characters, where N is a second predetermined number smaller than M;

e) if said end-of-instruction code is not found, leaving the modem in data transmission mode; and f) if said end-of-instruction codes is found, authorizing the modem to switch from data transmission mode to command mode.

Other aspects, objects, and advantages of the present invention appear more clearly on reading the following detailed description of a preferred embodiment given by way of a non-limiting example and made with reference to the accompanying drawings.

DESCRIPTION OF THE PRESENT INVENTION

Figure 1:
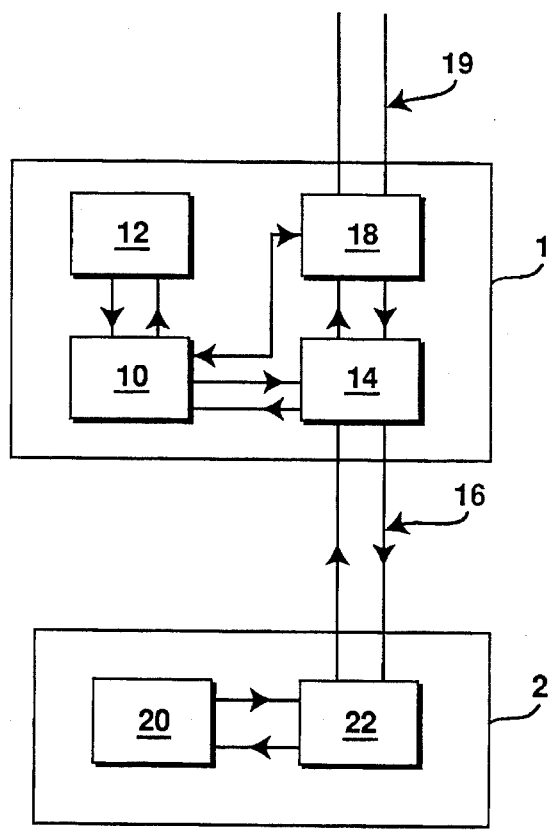
FIG. 1 is a block diagram of a modem and an associated host computer, the modem being implemented in application of the principles of the present invention.

With reference initially to FIG. 1, the intelligent modem of the present invention is given overall reference 1. It comprises a microprocessor or microcontroller 10, a read-only memory 12 containing a program that controls the operation of the microprocessor, a read/write memory 14 that is used totally or in part to constitute a buffer memory of M characters for digital data to be transmitted, prior to modulation, and for digital data to be received, after demodulation. Reference 18 designates a conventional modulator-demodulator circuit properly connected to a telephone line 19.

A both-way line 16 connects the modem 1 to a host computer 2 which conventionally comprises a central processor unit 20, an input/output port 22, memories, and conventional auxiliary devices that are not described in detail to avoid encumbering the description.

When the modem is in "on-line" mode, digital information to be transmitted over telephone line 19 to an apparatus connected to the other end of the line (not shown) is stored temporarily in the buffer memory 14 and is modulated in the circuit 18.

In the prior art, modem switching from "on-line" mode to "command" mode must take place when the modem observes the presence, in the stream of digital data to be transmitted, of special data inserted by the host computer and organized in the following manner:

<T1>+++<T2> where:

<T1>designates a first period of silence of predetermined duration;

<T2>designates a second period of silence of predetermined duration; and

+++ designates this particular string of characters (called "escape" characters) in standard "ASCII" format.

After sending this sequence, the host computer, and more precisely the communications software installed therein, takes it for granted that the modem has switched to "command" mode and that subsequent data sent to the modem will be treated as command instructions. These instructions conventionally take the following form:

ATxxx . . . xxx<CR> where:

AT designates either the sequence of characters "A" and "T" in ASCII code, or else the same characters in lower case; xxx . . . xxx is the specifier of an instruction forming part of a standard set of instructions and having a maximum length that may be 40 characters, for example; and <CR> designates the ASCII code for "Carriage Return".

The purpose of the periods of silence T1 and T2 was originally to prevent the modem switching from "on-line" mode to "command" mode in the event of the stream of data to be transmitted fortuitously containing the ASCII character sequence "+++". Thus, in the prior art, whenever such a sequence is detected but without periods of silence being detected before and after by using suitable timing means, the modem knows that it must remain in "on-line" mode.

The modem of the present invention does not include any special means, be they in hardware form or in software form, for detecting the above-mentioned periods of silence, yet it is nevertheless capable of distinguishing with a high degree of reliability between the sequence mentioned above and a sequence +++ that occurs fortuitously in the stream of data while the modem is "on-line".

According to an essential aspect of the invention, the modem includes logic for detecting a sequence +++AT regardless of when it occurs (i.e. no predetermined pauses needed), and logic for scanning a determined set of ASCII characters following such a sequence.

Figure 2:
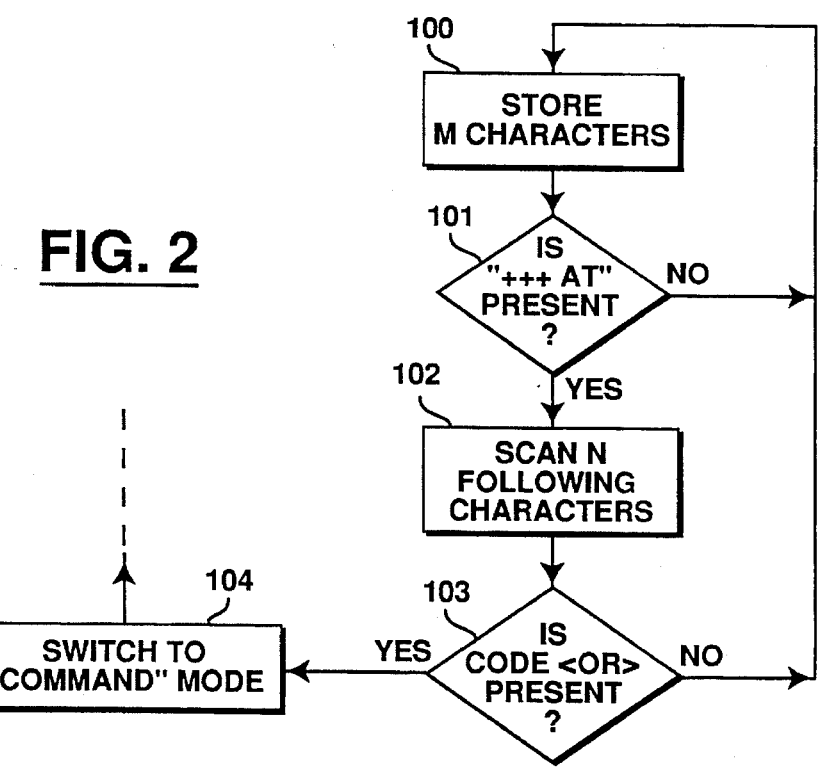
FIG. 2 is a flow chart of a mechanism of the invention for detecting an escape sequence.

More precisely, and now with reference to FIG. 2, the microprocessor stores data received from the host computer sequentially in the buffer memory 14 (step 100), and then examines the contents of the buffer memory periodically (each time its contents is updated), implementing the following process:

(a) so long as an uninterrupted +++AT sequence is not detected, the modem remains in "on-line" mode and continues to modulate and transmit over line 19 the data coming from the computer 2 and transmitted via the memory 14 (step 101);

(b) as soon as a +++AT sequence is recognized, the logic of the modem scans the N characters following said sequence (step 102), where N is a predetermined fixed integer less than the character capacity M of the buffer memory and greater than the maximum length of an instruction character string xxx . . . xxx, with scanning being done as follows (step 103);

(b1) if, in the N characters, the carriage return code <CR> is not found, then the modem likewise remains in "on-line" mode and goes back on watch for the appearance of a new +++AT sequence;

(b2) if, in the above N characters, a <CR> code is found, then the modem assumes that the host computer has sent it an escape sequence, and the modem switches immediately to "command" mode (step 104).

The above steps make it possible with very high reliability to distinguish between a genuine escape sequence and a +++ sequence or even a +++AT sequence that happens to occur fortuitously in the stream of data.

More particularly, if a +++ sequence appears, the modem verifies initially whether said sequence is followed by an "AT" sequence. It may already be observed that the probability of finding such an overall +++AT sequence fortuitously in the data stream is considerably less than the probability of finding a +++ sequence on its own in the stream.

Furthermore, for a detected +++AT sequence to correspond, in fact, to an instruction to switch to command mode, it is essential for a <CR> character to be found in the N characters following said sequence. The probability of finding a complete +++ATxxx . . . xxx<CR> sequence fortuitously in the data stream is very much less than the probability of finding a +++AT sequence therein, and in practice turns out to be quite acceptable.

The number N is chosen, as mentioned above, as a function of the length of the command instructions for the modem, i.e. the length of the above-mentioned string xxx . . . xxx. In a particular standard set of instructions, the maximum authorized length for such instructions is 40 characters, which means that it is possible to set N=41.

However, in that particular standard set, it has been observed more specifically that the maximum length of instructions used in practice is 13 characters. Under such conditions, and in order further to reduce the possibility that data to be transmitted by the modem fortuitously contains a sequence that could switch the modem wrongly to "command" mode, it is possible to select N equal to 14 or to a slightly greater number.

It is observed that using the detection mechanism of the present invention, and in contrast to the prior art detection mechanism, the modem switches to "command" mode only after it has received the <CR> code that follows the ATxxx . . . xxx instruction proper. However, because of the buffer memory 14, said instruction remains accessible for execution after the modem has switched to "command" mode.

To further improve the reliability of discrimination between a fortuitous +++ATxxx . . . xxx<CR> sequence and a genuine escape sequence, the software residing in the modem may optionally include a module for syntactical analysis of the characters xxx . . . xxx to verify whether or not they constitute an instruction in a standard set of modem command instructions. If the characters xxx . . . xxx constitute a valid instruction, the sequence is validated as being an escape sequence and then the instruction xxx . . . xxx already contained in the buffer memory is performed. If no valid instruction is detected, the modem remains "on-line" and merely transmits said sequence over the telephone line after modulation.

Such syntactical analysis is not described in detail in order to avoid overloading the description. It may be closely based on the syntax analyses that are performed by interpreters or compilers used in association with common programming languages.

Certain communication software packages exist that send a <CR> code to the modem between the +++ string and ATxxx . . . xxx string. To cover such circumstances as well, the logic of the modem is advantageously designed so that above-mentioned step (a) becomes following step (a'):

(a') so long as neither an uninterrupted +++AT sequence nor an uninterrupted +++<CR>AT sequence is detected, the modem remains in "on-line" mode and continues to modulate and transmit over line 19 the data arriving from the computer 2 and transmitted via the memory 14.

Naturally, the present invention is not limited in any way to the embodiment described above and shown in the drawings, and a person skilled in the art will be able to apply any variation or modification thereto that comes within its spirit.

We claim:

1. A method of detecting an escape sequence to cause a modem to switch from a data transmission mode in which a stream of digital data can be supplied to the modem from an associated host computer, be modulated by the modem and be transmitted over a telephone line, to a command mode in which the modem can receive command instructions from said host computer without modulating them and without transmitting them over said line, said escape sequence comprising a first predetermined set of characters and a second predetermined set of characters, said first and second predetermined sets of characters preceding a command instruction, the method comprising the following steps:

a) temporarily storing in succession in a memory M characters received by the modem from the host computer, where M is a first predetermined number;

b) detecting whether said memory contains in contiguous manner said first predetermined set of characters and said second predetermined set of characters;

c) leaving the modem in data transmission mode if said memory does not contain the contiguous occurrence of said first and second predetermined sets of characters;

d) if said memory does contain the contiguous occurrence of said first and second predetermined sets of characters, detecting whether an end-of-instruction code is to be found in the N characters following said first and second contiguous predetermined sets of characters, where N is a second predetermined number smaller than M;

e) leaving the modem in data transmission mode if said end-of-instruction code is not detected in said N characters; and f) if said end-of-instruction code is detected in said N characters, authorizing the modem to switch from data transmission mode to command mode.

2. A method according to claim 1, wherein the end-of-instruction code comprises a carriage return code "<CR>".

3. A method according to claim 1, wherein said first predetermined set of characters comprises a sequence "+++".

4. A method according to claim 1, wherein said second predetermined set of characters comprises an instruction preamble sequence "AT" or "at".

5. A method according to claim 1, in which said command instruction has a predetermined maximum number of characters, wherein the number N is greater than said maximum number of characters by at least one unit.

6. A method according to claim 5, wherein the number N is equal to 14.

7. A method according to claim 1 further comprising analyzing said command instruction for a valid sequence of characters, wherein if said sequence is valid, authorizing the modem to switch from data transmission mode to command mode, and wherein if said sequence in invalid, leaving the modem in data transmission mode.

8. A method according to claim 1, wherein said escape sequence comprises an end-of-escape-sequence code, said end-of-escape-sequence code arranged contiguous with and disposed between said first and second predetermined sets of characters.

9. A method according to claim 8, wherein the end-of-escape-sequence code comprises a carriage return code "<CR>".

10. A modem coupled to a telephone line and a digital data device, said modem having two distinct modes of operation;

a) a data transmission mode in which a stream of digital data can be supplied to the modem, modulated by the modem, and transmitted over said telephone line; and b) a command mode in which the modem can receive and process command instructions without transmitting them over said telephone line;

said modem comprising:

a memory storage element coupled to said digital data device for receiving a stream digital data supplied to the modem from said digital data device;

a signal processor coupled to said memory storage element; and a modem engine coupled to said signal processor and said memory storage element, said modem engine for modulating digital data received from said memory storage element to be transmitted over said telephone line, and said modem engine for demodulating analog signals supplied to said modem from said telephone line;

wherein said signal processor monitors M characters of the stream of digital data received by said memory storage element for the occurrence of an escape sequence wherein M is a first predetermined number, said escape sequence including a first predetermined set of characters, a second predetermined set of characters, said first and said second predetermined set of characters proceeding a command instruction, said signal processor determining whether said first and second predetermined sets of characters are contiguous in said memory storage element, wherein if said first and second predetermined sets of characters are not contiguous said signal processor leaving said modem in data transmission mode, wherein if said first and second predetermined sets of characters are contiguous in said memory storage element, then said signal processor further determining whether an end-of-instruction code is to be found in N characters following said first and second contiguous predetermined sets of characters, wherein N is a second predetermined number smaller than M, wherein if said end-of-instruction code is located in said N characters then authorizing the modem to switch from data transmission mode to command mode, wherein if said end-of-instruction code is not located in said N characters, then leaving the modem in said data transmission mode.

11. The modem of claim 10 wherein said end-of-instruction code comprises a carriage return code "<CR>".

12. The modem of claim 10 wherein said first predetermined set of characters comprises "+++".

13. The modem of claim 10 wherein said second predetermined set of characters comprises an instruction preamble sequence "AT" or "at".

14. The modem of claim 10 wherein said escape sequence has a predetermined maximum number of characters, and wherein the number N is greater than said maximum number of characters by at least one unit.

15. The modem of claim 14 wherein the number N is equal to 14.

16. The modem of claim 10 wherein said escape sequence further comprises an end-of-escape-sequence code arranged contiguous with and disposed between said first and second predetermined sets of characters.

17. The modem of claim 16 wherein said end-of-escape-sequence code comprises a carriage return code "<CR>".

18. The modem according to claim 10 wherein said signal processor further analyzes the command instruction, wherein if said command instruction is a valid instruction, authorizing the modem to switch from transmission mode to command mode, wherein if said command instruction is an invalid instruction, leaving the modem in said data transmission mode.

* * * * *